(12) United States Patent
Bauer et al.

(10) Patent No.: US 10,752,054 B2
(45) Date of Patent: Aug. 25, 2020

(54) VEHICLE AXLE

(71) Applicant: ZF Friedrichshafen AG

(72) Inventors: Manuel Bauer, Tittling (DE); Paul Lenz, Waldkirchen (DE); Horst Sigl, Tiefenbach (DE); Alexander Enderl, Vilshofen (DE); Rudolf Neumüller, Buechlberg (DE); Daniel Dudek, Salzweg (DE); Stefan Brachmeier, Geisenhausen (DE); Peter Haselberger, Mauth (DE); Daniela Wagner, Egglham (DE); Rainer Hildebrand, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 493 days.

(21) Appl. No.: 15/735,795

(22) PCT Filed: May 23, 2016

(86) PCT No.: PCT/EP2016/061524
§ 371 (c)(1),
(2) Date: Dec. 12, 2017

(87) PCT Pub. No.: WO2016/206881
PCT Pub. Date: Dec. 29, 2016

(65) Prior Publication Data
US 2020/0040983 A1    Feb. 6, 2020

(30) Foreign Application Priority Data

Jun. 23, 2015   (DE) ........................ 10 2015 211 527

(51) Int. Cl.
*B60B 35/16*   (2006.01)
*F16H 57/037*  (2012.01)
(Continued)

(52) U.S. Cl.
CPC ......... *B60B 35/166* (2013.01); *F16H 57/037* (2013.01); *F16H 57/0483* (2013.01);
(Continued)

(58) Field of Classification Search
CPC ....... B60B 35/14; B60B 35/16; B60B 35/163; B60B 35/166; F16H 57/0483; F16H 57/037
See application file for complete search history.

(56) References Cited

U.S. PATENT DOCUMENTS 3,153,464 A * 10/1964 Nelson .................... F16H 48/06
184/11.2
4,594,912 A *  6/1986 Ishikawa ................ B60B 35/16
74/606 R (Continued)

FOREIGN PATENT DOCUMENTS

| DE | 102012206641 | 10/2013 |
|----|--------------|---------|
| GB | 807832       | 1/1959  |
| WO | WO2015092471 | 6/2016  |

*Primary Examiner* — Kip T Kotter
(74) *Attorney, Agent, or Firm* — Cozen O'Connor

(57) ABSTRACT

A vehicle axle includes, an axle gear unit housing and axle tubes adjoining the latter. The axle gear unit housing has an opening which is surrounded by a flange. Threaded blind bore holes extend beyond the thickness of the flange into the region of the wall of the axle gear unit housing which has radially outwardly on the side of the flange facing the axle gear unit housing a wall thickening which extends annularly radially circumferentially along the flange and which is configured in a continuously annular manner or so as to form spot faces partially in the areas of the threaded blind bore holes, wherein a joint flash extends in a central plane along the axle tubes and toward the flange 4 in the region of the axle gear unit housing and at the flange along the radially outer contour of the wall thickening.

2 Claims, 2 Drawing Sheets

(51) Int. Cl.
    *F16H 57/04*     (2010.01)
    *B60B 35/14*     (2006.01)

(52) U.S. Cl.
    CPC ......... *B60B 35/14* (2013.01); *B60B 2900/111* (2013.01); *B60B 2900/561* (2013.01)

(56) References Cited

U.S. PATENT DOCUMENTS

| | | | |
|---|---|---|---|
| 9,919,559 B2* | 3/2018 | Szczepanski | B60B 35/166 |
| 2003/0177859 A1* | 9/2003 | Allmandinger | F16H 57/037 |
| | | | 74/607 |
| 2005/0153811 A1* | 7/2005 | Beutler | F16H 57/029 |
| | | | 475/220 |
| 2006/0103232 A1* | 5/2006 | Beutler | B03C 1/286 |
| | | | 301/137 |
| 2006/0117906 A1 | 6/2006 | Petruska | |
| 2007/0191168 A1 | 8/2007 | Corless | |
| 2016/0355054 A1* | 12/2016 | Jensen | B60K 17/165 |

\* cited by examiner

VEHICLE AXLE

PRIORITY CLAIM

This is a U.S. national stage of application No. PCT/EP2016/061524, filed on May 23, 2016. Priority is claimed on the following application: Country: Germany, Application No.: 10 2015 211 527.5, filed: Jun. 23, 2015; the content of which is/are incorporated herein in its entirety by reference.

FIELD OF THE INVENTION

The present invention is directed to a vehicle axle which has, as one-part casting, an axle gear unit housing and one or two axle tubes adjoining the latter, the casting being produced in two mold halves divided at a joint flash, and the axle gear unit housing has an opening which is surrounded by a flange and which can be closed by a cover, and threaded blind bore holes are formed at right angles to the plane of the flange such that they are uniformly distributed radially circumferentially at the flange and extend beyond the thickness of the flange into the region of the wall of the axle gear unit housing.

BACKGROUND OF THE INVENTION

In a vehicle axle of this type, it is known to arrange the threaded blind bore holes on a bolt circle such that they would extend into the interior of the axle gear unit housing if the axle gear unit housing did not have spot faces which protrude into the interior of the axle gear unit housing as raised portions of the inner wall and which receive and close the threaded blind bore holes. However, these spot faces reduce the space available to the gear unit so that the axle gear unit housing must have larger dimensions and accordingly also has a greater weight and a greater oil volume. Moreover, the spot faces lead to negative influences on the oil flow due to swirling in the gear unit housing during the driving operation of the vehicle so that the lubrication of the gear unit is negatively affected. The casting is produced in two mold halves whose joint flash extends in a continuous central plane through the axle tube as well as through the axle gear unit housing.

SUMMARY OF THE INVENTION

Therefore, it is an object of the present invention is to provide a vehicle axle of the type mentioned above whose axle gear unit housing has a reduced installation space and a reduced weight and which improves the oil flow in the interior of the gear unit housing.

This object is met according to the invention in that the axle gear unit housing has radially outwardly on the side of the flange facing the axle gear unit housing a wall thickening which extends annularly radially circumferentially along the flange and which is configured in a continuously annular manner or so as to form spot faces partially in the areas of the threaded blind bore holes, and the joint flash extends in a central plane along the axle tubes and is guided toward the flange in the region of the axle gear unit housing and at the flange along the radially outer contour of the wall thickening.

Owing to this configuration, the dimensions of the interior of the axle gear unit housing can be reduced such that the components of the gear unit can protrude near to the inner wall of the gear unit housing. Along with the interior of the axle gear unit housing reduced in this way, the overall dimensions of the axle gear unit housing and, therefore, also its weight are also reduced. Owing to the inventive configuration of the joint flash, the casting can be removed from the mold without difficulty in spite of the wall thickening projecting outward. The oil flow in the axle gear unit housing is substantially improved because there are no longer spot faces protruding radially into the interior of the axle gear unit housing.

When the wall of the interior of the axle gear unit housing is formed in a freely continuously curved manner by wall areas which protrude inward, a particularly good oil flow is achieved in the axle gear unit housing.

BRIEF DESCRIPTION OF THE DRAWINGS

An embodiment of the invention is shown in the drawing and will be described more fully in the following with reference to the drawings in which.

DETAILED DESCRIPTION OF THE PRESENTLY PREFERRED EMBODIMENTS

Figure 1:
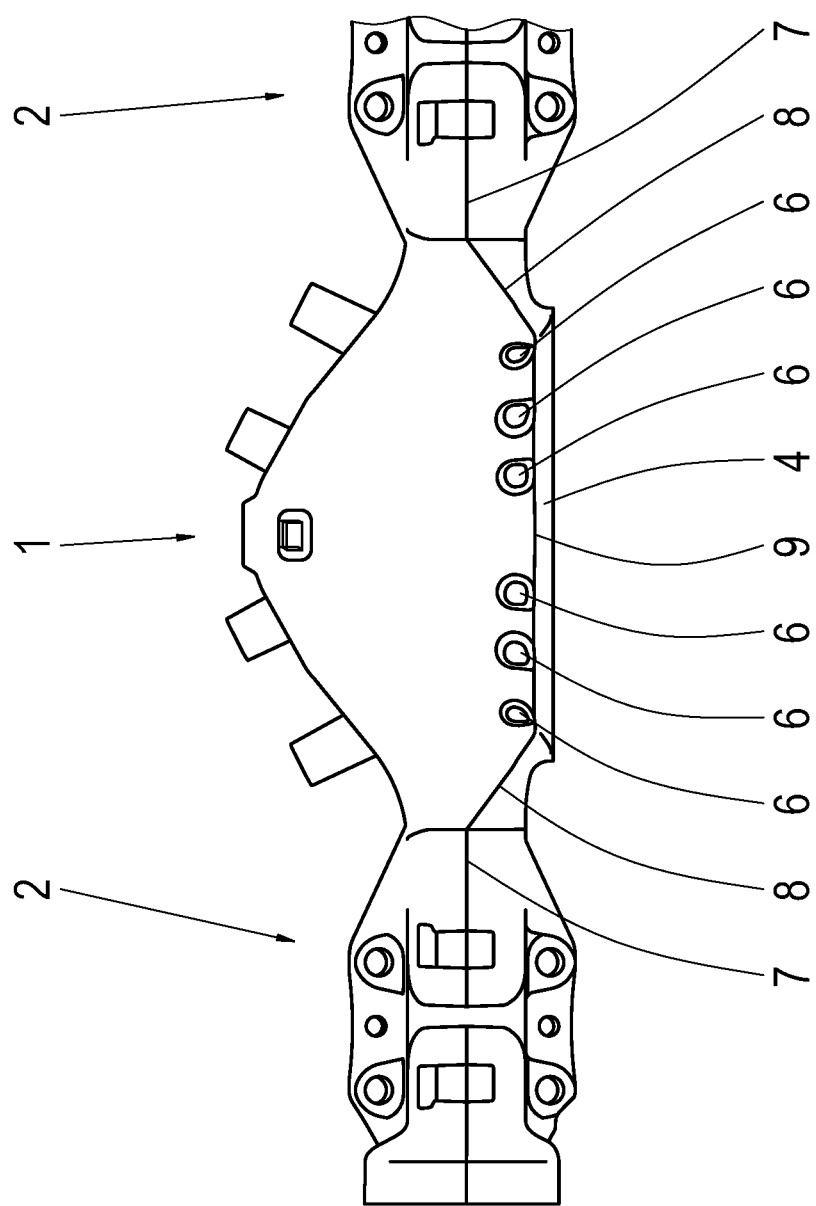
FIG. 1 is a side view of a vehicle axle in accordance with the present invention.

The vehicle axle shown in the drawing has an axle gear unit housing 1 from which two axle tubes 2 project opposite one another. Axle gear unit housing 1 and axle tubes 2 are a one-part casting.

The axle gear unit housing 1 has a bell-like shape with an opening 3 surrounded by a flange 4 at its underside. Threaded blind bore holes 5 are formed in the flange 4 at right angles to the plane of the flange 4 such that they are uniformly distributed radially circumferentially. The threaded blind bore holes 5 extend by their inner end area into spot faces 6 which are formed on the side of the flange 4 facing the axle gear unit housing 1 as wall thickening of the wall of the axle gear unit housing 1. Accordingly, the inner ends of the threaded blind bore holes 5 are closed rather than open to the outside.

The casting of axle gear unit housing 1 and axle tubes 2 is produced in two mold halves with a joint flash extending at the axle tubes 2 along a central plane 7 of the axle tubes 2 and transitions to the flange 4 as transitional joint flash 8 in the region of the axle drive housing 1 and extends at that location as drive housing joint flash 9 along the radially outer contour of the spot faces 6 on the side of the flange 4 facing the drive housing.

This joint flash is to be regarded as a joint fin at the demolded vehicle axle.

Figure 2:
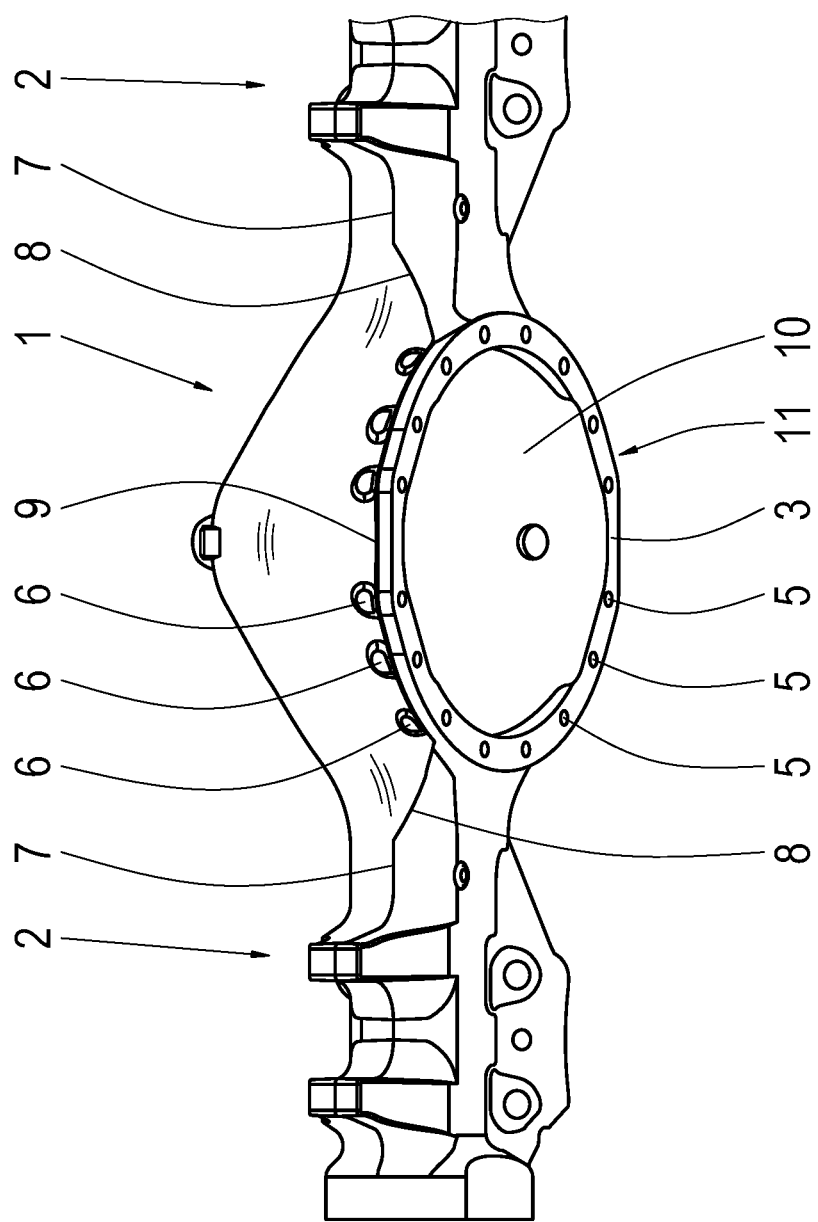
FIG. 2 is a perspective side view of the axle according to FIG. 1.

As can be seen in FIG. 2, the wall 10 of the interior 11 of the axle gear unit housing 1 is formed freely continuously by inwardly projecting wall areas.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A vehicle axle comprising:
as a one-part casting, an axle gear unit housing comprising a wall and one or two axle tubes adjoining the axle gear unit housing, wherein the casting is produced in two mold halves divided at a joint flash; the axle gear unit housing further comprising an opening and a flange surrounding the opening, and a cover for closing the opening; the axle gear unit housing further comprising threaded blind bore holes formed at right angles to the plane of the flange so that the blind bore holes are uniformly distributed radially circumferentially at the flange; the axle gear housing further comprising radially outward on the side of the flange facing the axle gear unit housing a wall thickening having an outer contour, the wall thickening extending radially circumferentially along the flange and which is configured in a continuously annular manner or so as to form spot faces partially in the areas of the threaded blind bore holes; wherein the joint flash extends in a central plane along the axle tubes and is guided toward the flange in the region of the axle gear unit housing and at the flange along the radially outer contour of the wall thickening; and the blind bore holes extending beyond the thickness of the flange into the region of the wall of the axle gear unit housing.

2. The vehicle axle according to claim 1, additionally comprising a wall defining an interior of the axle gear unit housing and wherein the wall (10) of the interior (11) of the axle gear unit housing (1) is formed in a continuously curved manner free of wall areas which protrude inward.

\* \* \* \* \*